United States Patent
Hua et al.

(10) Patent No.: US 7,421,580 B2
(45) Date of Patent: Sep. 2, 2008

(54) METHOD AND APPARATUS FOR SYNCHRONIZING E-MAIL ADDRESSES

(75) Inventors: Morgan Hua, Sunnyvale, CA (US); Jose Machuca, Mountain View, CA (US)

(73) Assignee: AOL LLC a Delaware limited liability company, Dulles, VA (US)

( * ) Notice: Subject to any disclaimer, the term of this patent is extended or adjusted under 35 U.S.C. 154(b) by 782 days.

(21) Appl. No.: 10/218,245

(22) Filed: Aug. 12, 2002

(65) Prior Publication Data
US 2004/0030897 A1    Feb. 12, 2004

(51) Int. Cl.
*H04L 9/00* (2006.01)
*G06F 15/16* (2006.01)

(52) U.S. Cl. .................................... 713/168; 709/206
(58) Field of Classification Search ................. 709/206; 713/168

See application file for complete search history.

(56) References Cited

U.S. PATENT DOCUMENTS

| | | | |
|---|---|---|---|
| 2001/0005859 A1* | 6/2001 | Okuyama et al. | 709/245 |
| 2002/0004821 A1* | 1/2002 | Togawa et al. | 709/206 |
| 2002/0103932 A1* | 8/2002 | Bilbrey et al. | 709/245 |

FOREIGN PATENT DOCUMENTS

WO    2004/015915 A1    2/2004

* cited by examiner

*Primary Examiner*—Benjamin E Lanier
(74) *Attorney, Agent, or Firm*—Michael A. Glenn; Glenn Patent Group

(57) ABSTRACT

A method for synchronizing a user's e-mail addresses in two locations and validating the synchronized e-mail address is provided, wherein the two locations can be an authentication proxy and an integrated authorized site of the authentication proxy, or they can be the authentication proxy and a partner site of the authentication proxy. Also disclosed are several methods for maintaining the synchronized status and confirmed status when the user changes his e-mail address from either of the two locations.

27 Claims, 16 Drawing Sheets

METHOD AND APPARATUS FOR SYNCHRONIZING E-MAIL ADDRESSES

BACKGROUND OF THE INVENTION

1. Technical Field

The invention relates generally to online authentication technology. More particularly, the invention relates to a system and method for synchronizing user contact information between an authentication proxy and an authorized site.

2. Description of the Prior Art

The explosive growth of the Internet is changing the ways in which we communicate, conduct business, and pursue entertainment. A few years ago, electronic commerce (E-commerce) was just an interesting concept. Today, not only are consumers buying an enormous volume of goods or services over the Internet, but the business-to-business E-commerce has taken off as well.

The basic cell of E-commerce is an electronic transaction, which requires a buyer or user to fill out one or more electronic forms on screen and click a button, such as "send", "buy", or "submit". To complete such an electronic transaction, a user must go through an authentication process. In other words, the user must provide the seller or service provider with some information such as personal identification, contact information, or even financial information. The authentication process may take from several seconds to hours. Because each seller or service provider maintains its own authentication server and database, millions of sellers and service providers might share thousands of millions of consumers or users. Some of the consumers or users might be required to go through the same or similar authentication process repetitively if they have transactions with many sellers or service providers. This repetitive authentication not only wastes consumers' precious time, but also burdens the sellers or service providers because they have to expand their databases to keep detailed authentication information for a growing number of users. This situation brings forth a technical need to create a universal, unified single-logon infrastructure wherein a specific user may be authenticated once for all and wherein the authentication result is widely recognized by a large number of sellers or service providers.

As of the current state of art, the user has to perform a substantially similar registration step at each online merchant or service provider site. Consequently, the user might have to create and memorize many ID's and passwords, and may have provided contact information such as an e-mail address.

E-mail is the most prevalent method for contacting someone on the Internet. The e-mail address identifies a user's electronic mailbox. Most online merchants or service providers requires a user to provide an e-mail address as contact information. Some sellers or service providers confirm the e-mail address by sending e-mail to the e-mail address and requiring the user to reply to the e-mail address. Over a period of time, e-mail addresses become invalid as a specific user changes their e-mail address and neglects to update their information at the online merchant or service provider site.

As a universal, unified single-logon infrastructure becomes prevalent, the e-mail addresses that sellers or service providers have gathered could be different for a specific user. It is likely that some of the different e-mail addresses are invalid.

What is desired is a method for selecting a valid e-mail address or the most desirable e-mail address and synchronizing the e-mail address between the authentication proxy and an integrated authorized site.

SUMMARY OF INVENTION

The invention discloses a method for synchronizing a user's e-mail addresses in two locations and validating the synchronized e-mail address. The two locations can be an authentication proxy and an integrated authorized site of the authentication proxy, or they can be the authentication proxy and a partner site of the authentication proxy. The invention also discloses several methods for maintaining the synchronized status and confirmed status when the user changes his e-mail address from either of the two locations.

In one preferred embodiment of the invention, a method for synchronizing and validating user contact information stored in two locations is provided. The method comprises the steps of: authenticating the user when the user signs in to an authentication proxy; synchronizing the user contact information between a first location and a second location; and validating the synchronized user contact information.

In another equally preferred embodiment of the invention, it is disclosed herein a method for synchronizing a first e-mail address of a user in an authentication proxy and a second e-mail address of the user in an integrated authorized site of the authentication proxy. The method comprises the steps of: checking the first e-mail address and the second e-mail address; and if said first e-mail address is blank and said second e-mail address is set, copying said second e-mail address and a confirm status of said second e-mail address to said authentication proxy site.

In another equally preferred embodiment, the invention provides a method for confirming e-mail address change of a user from an old e-mail address to a new e-mail address in an authentication proxy and an integrated authorized site of said authentication proxy. The method comprises the steps of: sending a request confirmation e-mail message to said new e-mail address containing a confirm interface and sending a request cancellation e-mail message to said old e-mail address containing a cancellation interface; marking said user e-mail address change pending; and starting a response timer which is typically 72 hours.

In another equally preferred embodiment, the invention provides a method for validating an e-mail address of a user in authentication proxy. The method comprises the steps of: the user signing on to the authentication proxy; checking a confirm status of the e-mail address; and providing a graphical interface to the user when the confirm status of the e-mail address is unconfirmed; wherein the graphical interface comprises an e-mail not confirmed message, and a list of options comprises confirm later option, requesting new confirm e-mail option and specifying new e-mail address option.

In another equally preferred embodiment, the invention provides a method for registering a user of an authentication proxy to a partner site of the authentication proxy while keeping profile of the user synchronized. The method comprises the steps of: the user registering at the partner site; the user changing profile fields other than e-mail address; and synchronizing the new profile data with the authentication proxy.

In another equally preferred embodiment, the invention provides a method for changing profile of a user in an authentication proxy while keeping e-mail address of the user confirmed. The method comprises the steps of: the user editing the profile; checking whether a confirm status of the e-mail address is change pending; validating of new profile data when the user submits the new profile data; and confirming profile change after new profile data are submitted.

In another equally preferred embodiment, the invention provides a method for synchronizing all profile data of a user from a partner site of an authentication proxy to the authentication proxy. The method comprises the steps of: the user submitting the profile data at the partner site to the authentication proxy; the user changing profile fields other than e-mail address; and synchronizing the first profile data with the authentication proxy.

In another equally preferred embodiment, the invention provides a method for synchronizing individual field of profile data of a user from a partner site of an authentication proxy to the authentication proxy. The method comprises the steps of: the user submitting an individual field change of the profile data at the partner site to the authentication proxy; the user changing a field in the first profile data other than e-mail address; and synchronizing the first profile data with the authentication proxy.

The invention is also applicable to other user contact information such as a phone number associated with a mobile device such as a two-way pager or a phone browser.

DETAILED DESCRIPTION

In one preferred embodiment of the invention, e-mail addresses are stored in the integrated authorized site and authentication proxy for one user ID. The e-mail addresses can be same or different. The e-mail address in the integrated authorized site can be confirmed or unconfirmed, and the e-mail address in the authentication proxy can also be confirmed or unconfirmed. When the e-mail address is changed in the integrated authorized site, a process for confirming the change will start.

Figure 1:
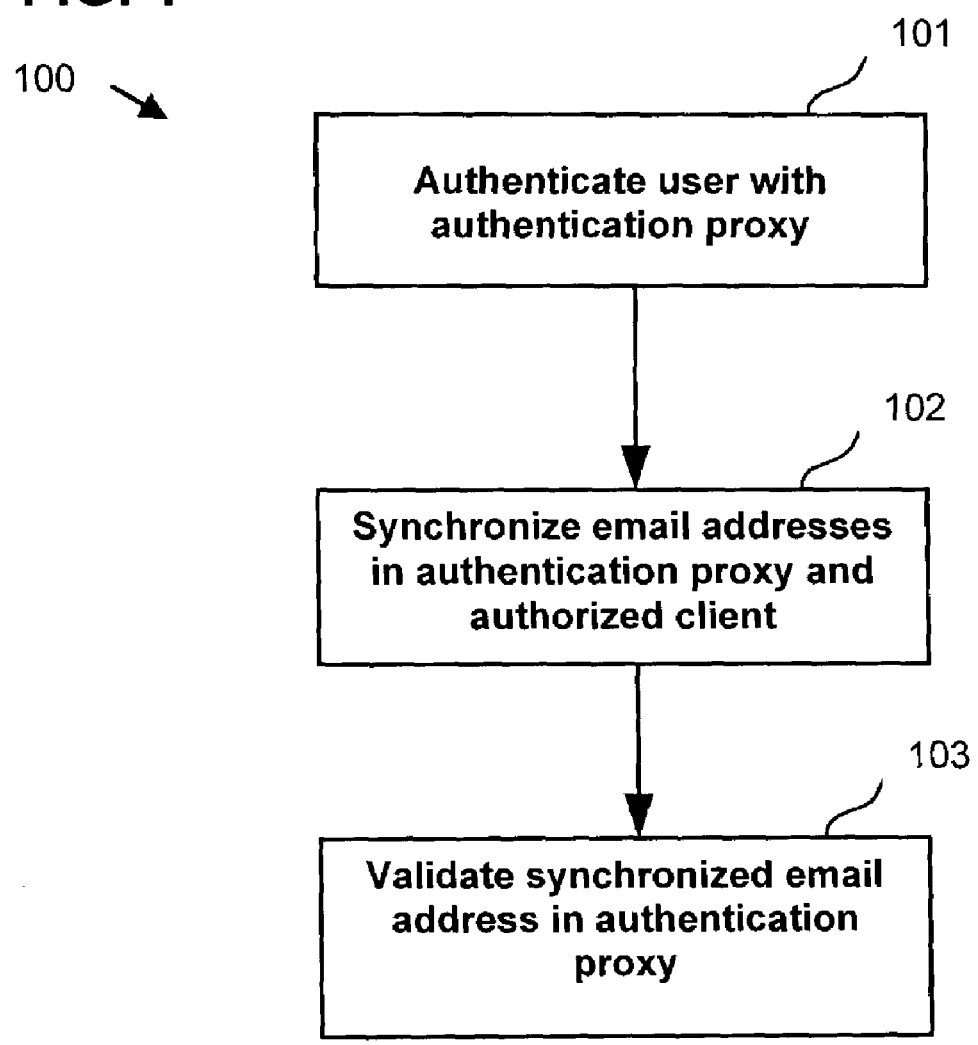
FIG. 1 is a flow diagram illustrating a method 100 for synchronizing and validating user contact information stored in two locations.

FIG. 1 is a flow diagram illustrating a method 100 for synchronizing and validating user contact information stored in two locations. The method comprises the following steps: authenticating the user when the user signs in to an authentication proxy 101; synchronizing the user contact information between a first location and a second location 102; and validating the synchronized user contact information 103.

Figure 2:
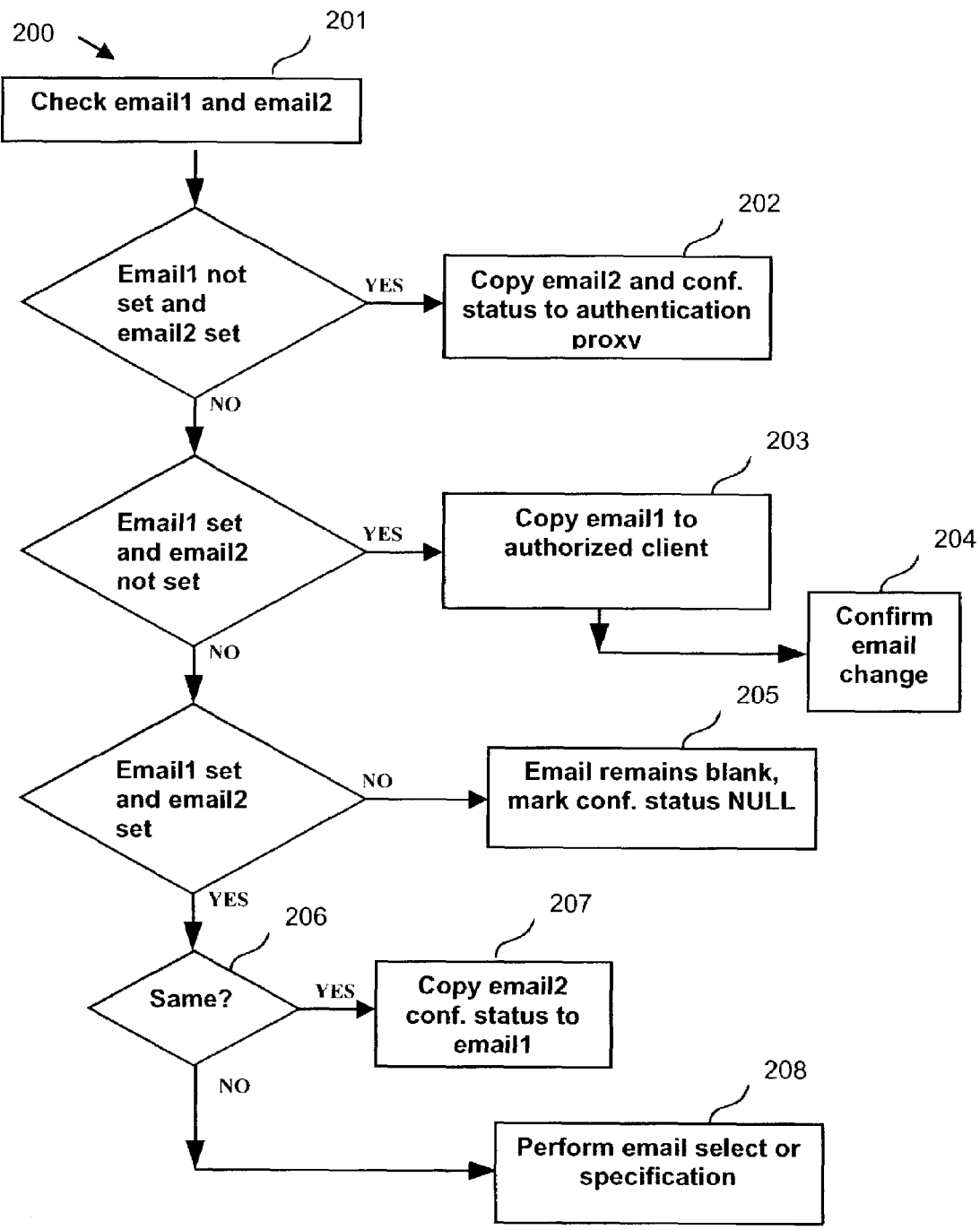
FIG. 2 is a flow diagram illustrating a method 200 for synchronizing a first e-mail address of a user in an authentication proxy and a second e-mail address of the user in an integrated authorized site of the authentication proxy.

FIG. 2 is a flow diagram illustrating a method 200 for synchronizing a first e-mail address of a user in an authentication proxy and a second e-mail address of the user in an integrated authorized site of the authentication proxy. The e-mail1 and e-mail2 in the diagram refer to the e-mail addresses in the authentication proxy and in the integrated authorized site respectively.

The method 200 comprises the following steps: checking the first e-mail address and the second e-mail address 201; if said first e-mail address is blank and said second e-mail address is set, copying said second e-mail address and a confirm status of said second e-mail address to said authentication proxy site 202.

Figure 4:
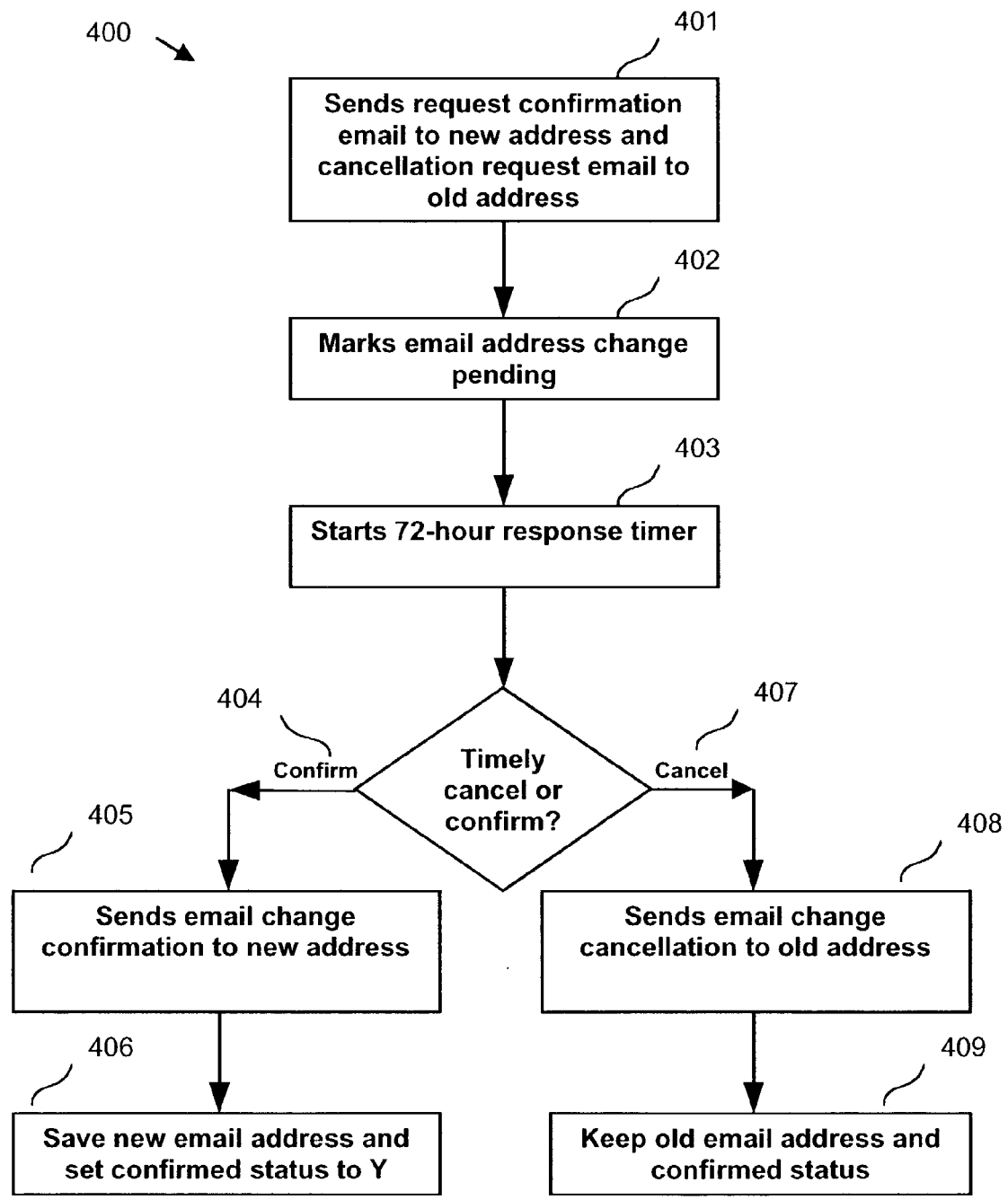
FIG. 4 is a flow diagram illustrating a method 400 for confirming e-mail address change of a user from an old e-mail address to a new e-mail address in an authentication proxy and an integrated authorized site of said authentication proxy.

If said first e-mail address is set but said second e-mail address is blank, copying said first e-mail address to said integrated authorized site 203; and confirming e-mail address change to said first e-mail address 204. The details of step 204 are illustrated in FIG. 4 below.

If said first e-mail address is blank and said second e-mail address is blank, keeping said first e-mail address blank and said confirm status of said first e-mail address NULL 205.

If the first e-mail address is set and the second e-mail address is set, checking whether the first e-mail address is the same as the second e-mail address 206; if the first e-mail address is the same as the second e-mail address, copying said confirm status of said second e-mail address to said authentication proxy 207.

If the first e-mail address is not the same as the second e-mail address, asking the user to choose among the first e-mail address and the second e-mail address, or specify a synchronized e-mail address 208.

Figure 3B:
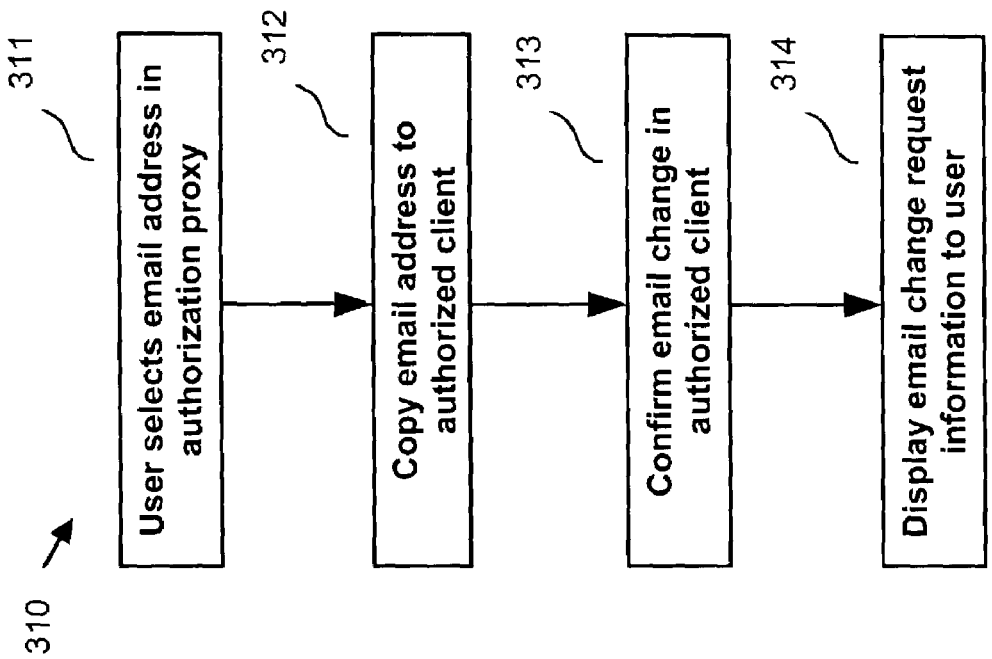
FIG. 3B is a flow diagram illustrating additional processing 310 of step 208 in method 200 in another typical embodiment.
Figure 3A:
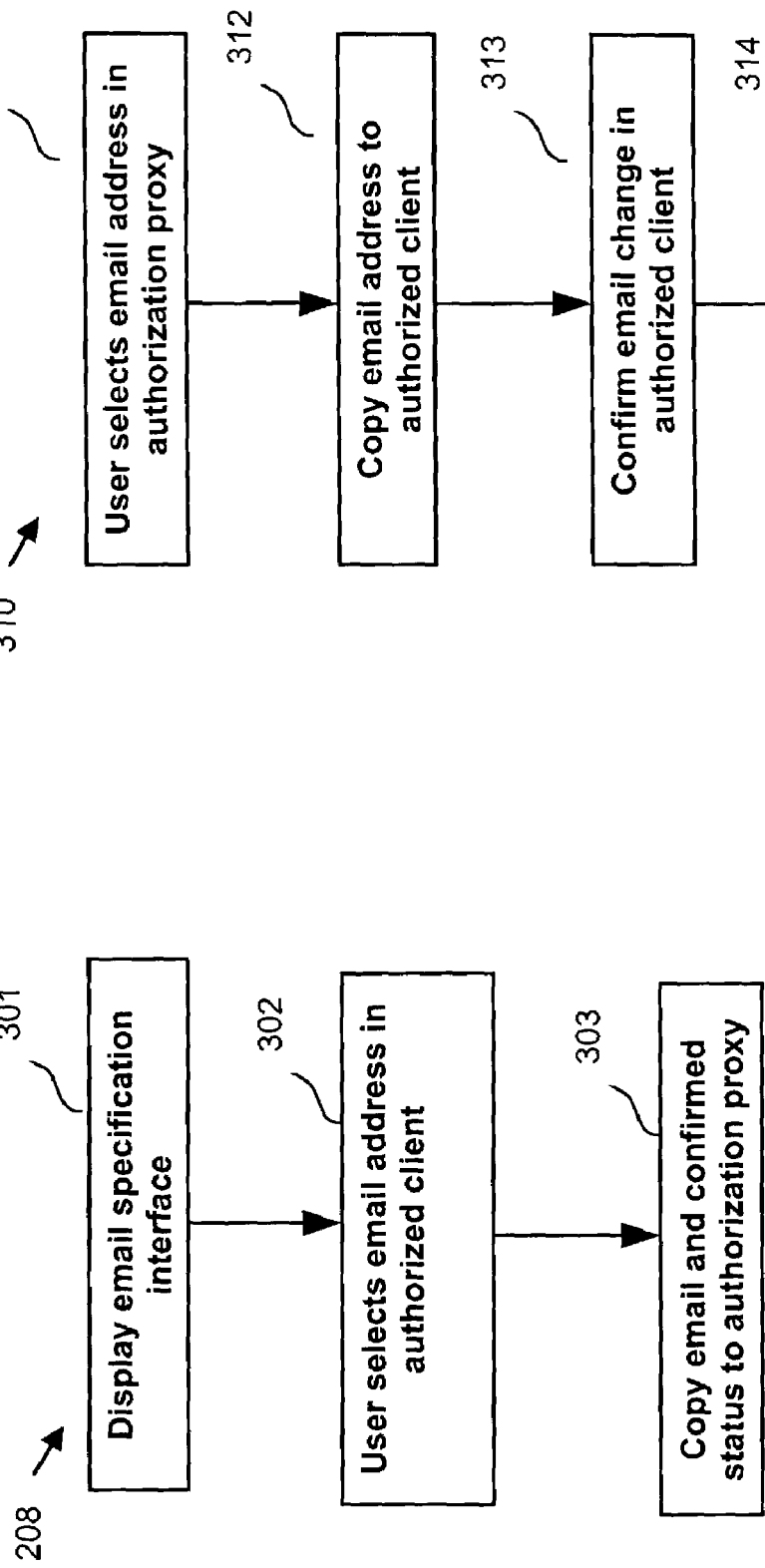
FIG. 3A is a flow diagram illustrating details of step 208 in method 200 in one typical embodiment.

FIG. 3A is a flow diagram illustrating details of step 208 in method 200 in one typical embodiment. The step 208 comprises the following sub-steps: providing a graphical interface for the user to choose among the first e-mail address and the second e-mail address, or specify the synchronized e-mail address 301; the user selecting the second e-mail address 302; and copying the second e-mail address to the authentication proxy 303.

FIG. 3B is a flow diagram illustrating additional processing 310 of step 208 in method 200 in another typical embodiment. The additional processing 310 comprises the following steps: the user selecting the first e-mail address 311; copying the first e-mail address to the authorized site 312; confirming e-mail address change from said second e-mail address to said first e-mail address 313; and displaying an e-mail change message to the user 314. The details of step 313 are illustrated in FIG. 4 below.

Figure 3C:
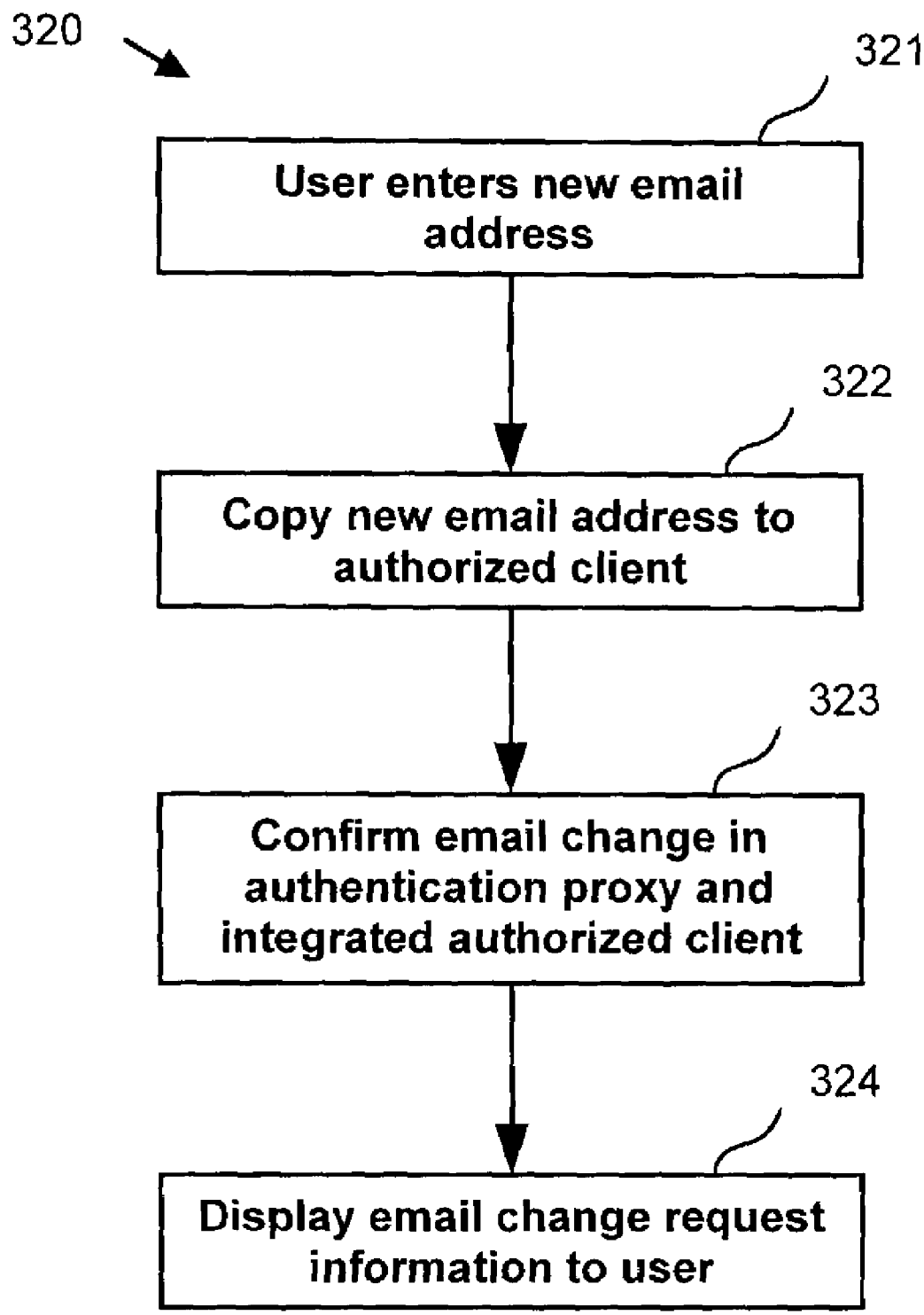
FIG. 3C is a flow diagram illustrating additional processing 320 of step 208 in method 200 in another typical embodiment.

FIG. 3C is a flow diagram illustrating additional processing 320 of step 208 in method 200 in another typical embodiment. The additional processing 320 comprises the following steps: the user specifying a third new e-mail address for authentication proxy 321; copying the third new e-mail address to the authorized site 322; confirming e-mail address change from said second e-mail address to said third new e-mail address 323; and displaying an e-mail change message to the user 324. The details of step 323 are illustrated in FIG. 4 below.

FIG. 4 is a flow diagram illustrating a method 400 for confirming e-mail address change of a user from an old e-mail address to a new e-mail address in an authentication proxy and an integrated authorized site of said authentication proxy. The method 400 comprises the following steps: sending a request confirmation e-mail message to said new e-mail address containing a confirm interface and sending a request cancellation e-mail message to said old e-mail address containing a cancellation interface 401; marking said user e-mail address change pending 402; starting a response timer which is typically 72 hours 403.

The method 400 further comprises the following steps: the user performing a confirm action through the confirm interface before the response timer expires 404; sending change confirmation e-mail message to said new e-mail address 405; and save said new e-mail address to said authentication proxy and said integrated authorized site and marking said confirm status of said new e-mail address confirmed in said authentication proxy and said integrated authorized site 406.

The method 400 further comprises the following steps: said user performing a cancel action through said cancel interface before said response timer expires 407; sending change cancellation e-mail message to said old e-mail address 408; and keep said old e-mail address and a confirmed status of said old e-mail address in said authentication proxy and said integrated authorized site 409.

Figure 5A:
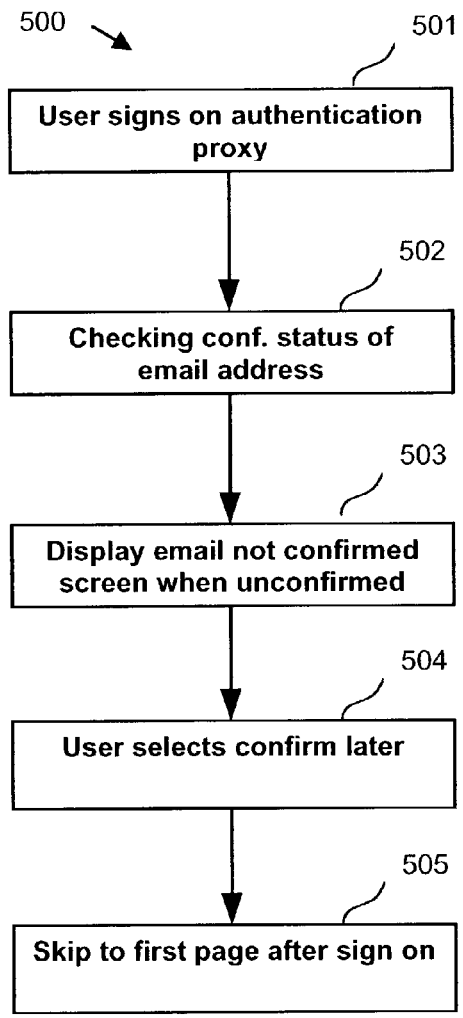
FIG. 5A is a flow diagram illustrating a method 500 for validating an e-mail address of a user in authentication proxy.

FIG. 5A is a flow diagram illustrating a method 500 for validating an e-mail address of a user in authentication proxy. The method 500 comprises the following steps: the user signing on to the authentication proxy 501; checking a confirm status of the e-mail address 502; and providing a graphical interface to the user when the confirm status of the e-mail address is unconfirmed 503, wherein the graphical interface comprising: an e-mail not confirmed message; and a list of options comprising: confirm later option, requesting new confirm e-mail option and specifying new e-mail address option; the user selecting the confirm later option 504; and directing the user to a first page after sign on 505.

Figure 5B:
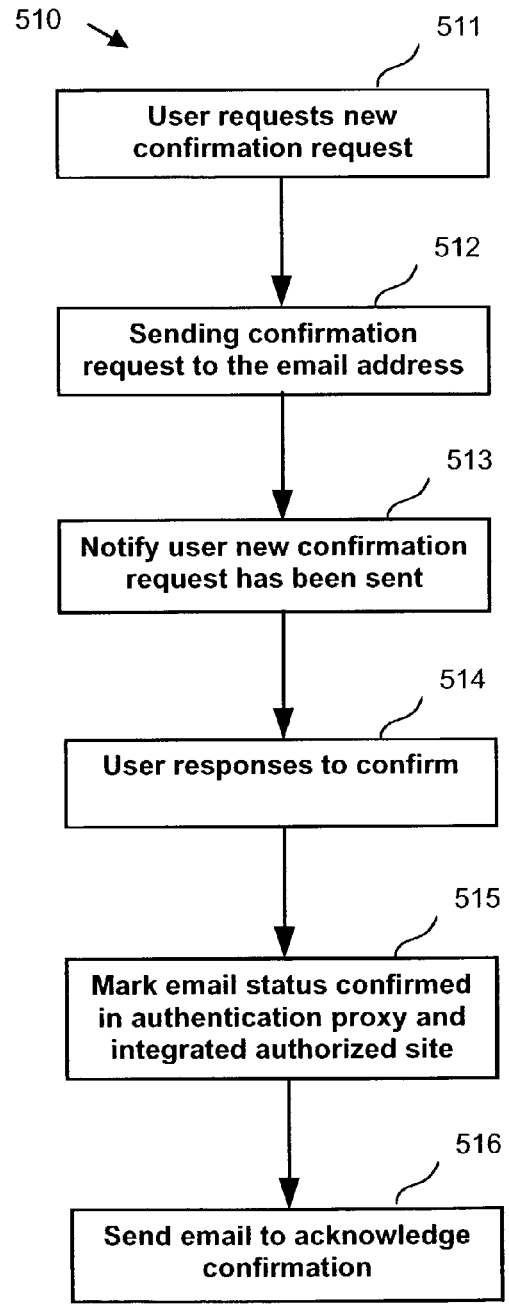
FIG. 5B is a flow diagram illustrating additional processing 510 of method 500 in another typical embodiment.

FIG. 5B is a flow diagram illustrating additional processing 510 of method 500 in another typical embodiment. The additional processing 510 comprises the following steps: the user selects the requesting new confirm e-mail option 511; sending the new e-mail to the e-mail address containing a confirm interface 512; displaying a message to the user that the new e-mail containing the confirm interface has been sent to the e-mail address 513; said user performing a confirm action through said confirm interface 514; marking said confirm status of said e-mail address confirmed in said authentication proxy and said integrated authorized site 515; and sending e-mail message to said e-mail address to acknowledge confirmation 516.

Figure 5C:
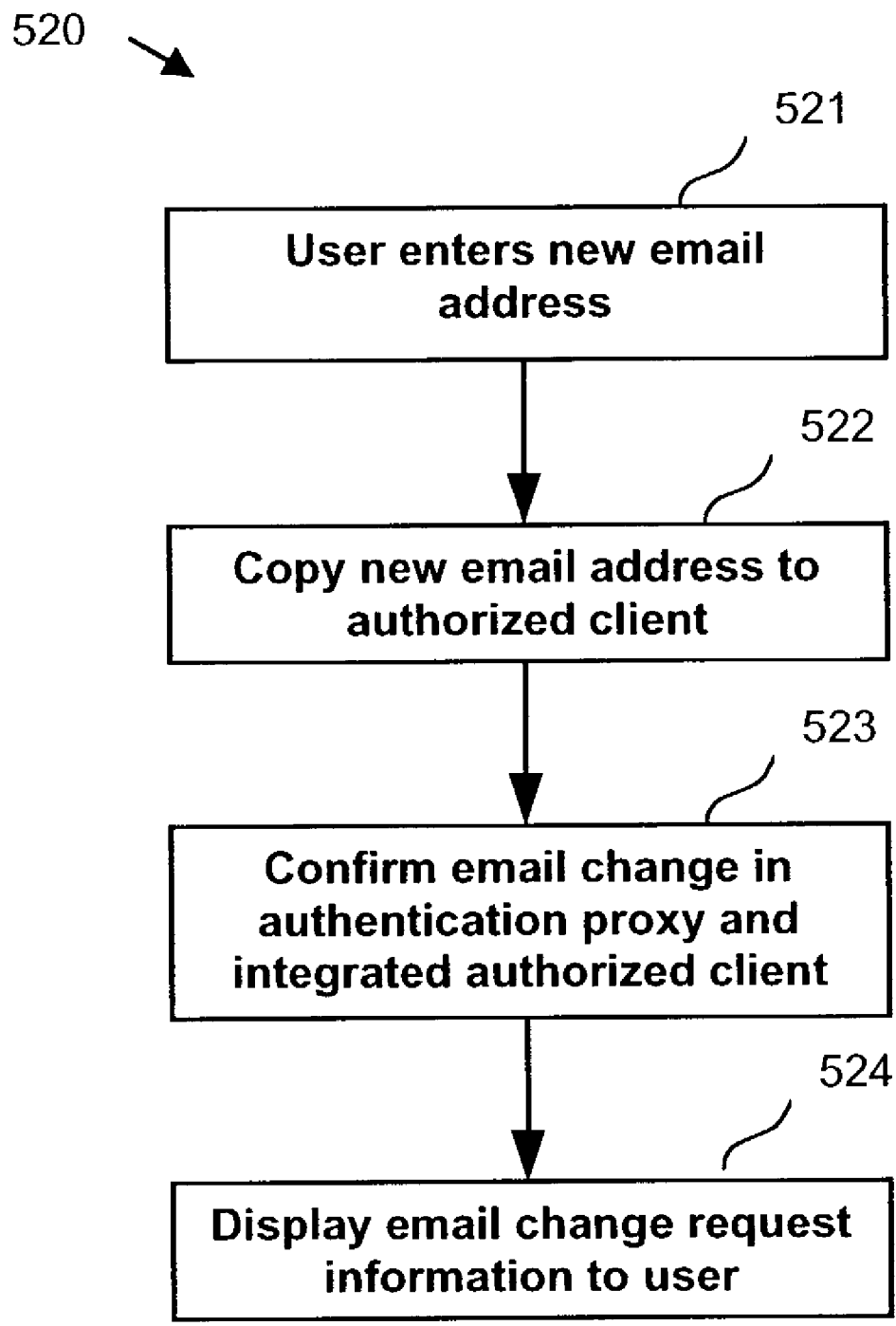
FIG. 5C is a flow diagram illustrating additional processing 520 of method 500 in another typical embodiment.

FIG. 5C is a flow diagram illustrating additional processing 520 of method 500 in another typical embodiment. The additional processing 520 comprises the following steps: the user specifying the a new e-mail address for authentication proxy 521; copying the new e-mail address to an integrated authorized site of the authentication proxy 522; confirming e-mail address change to said new e-mail address 523; and displaying an e-mail change message to the user 524. The details of step 523 are illustrated in FIG. 4.

Figure 6A:
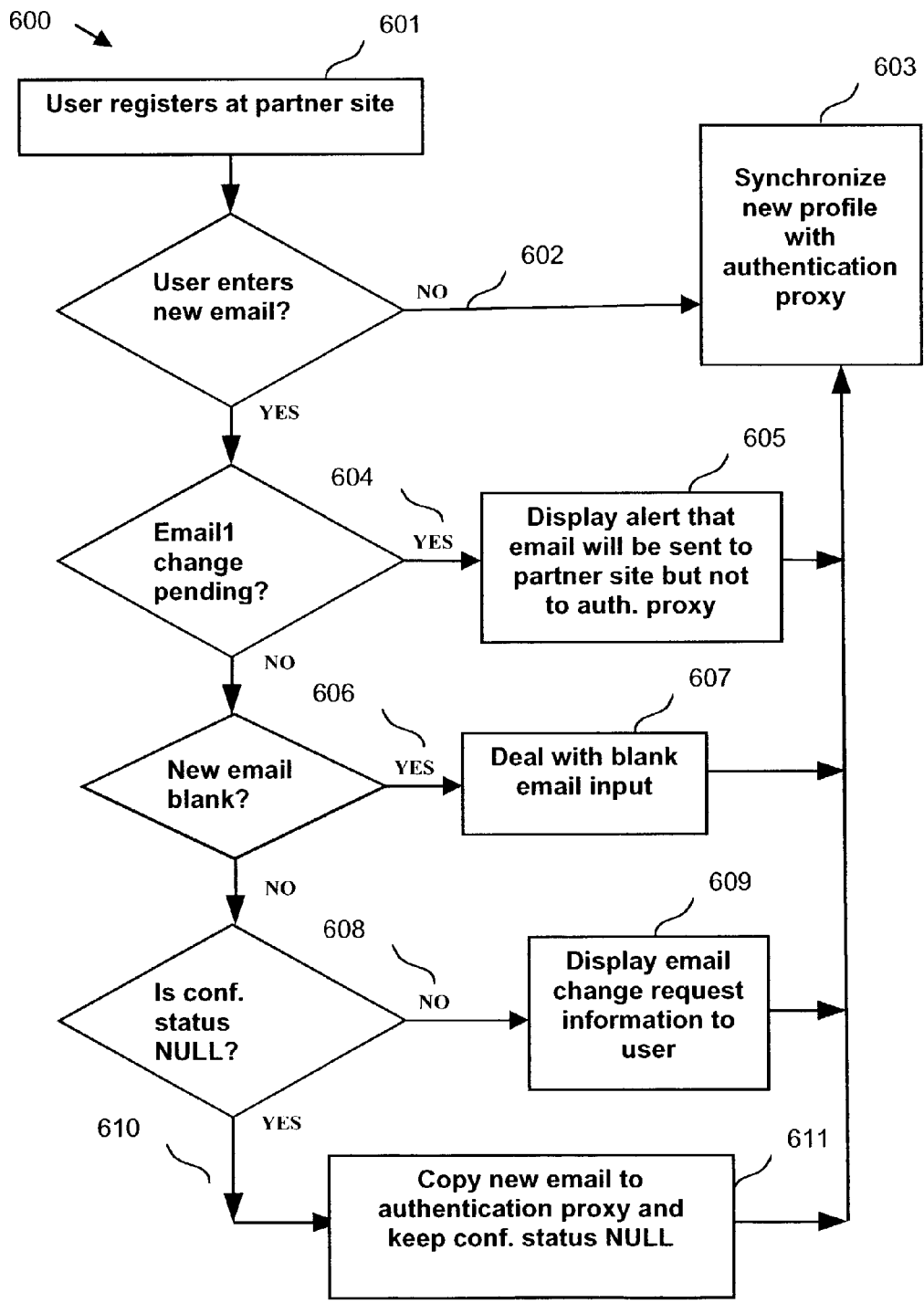
FIG. 6A is a flow diagram illustrating a method 600 for registering a user of an authentication proxy to a partner site of the authentication proxy while keeping profile of the user synchronized.

FIG. 6A is a flow diagram illustrating a method 600 for registering a user of an authentication proxy to a partner site of the authentication proxy while keeping profile of the user synchronized. The method 600 comprises the following steps: the user registering at the partner site 601; the user changing profile fields other than e-mail address 602; and synchronizing the new profile data with the authentication proxy 603.

The method 600 further comprises the following steps: the user entering a new e-mail address while a confirm status of the e-mail address is change pending 604; and displaying a message to the user that the new e-mail address will be sent to partner site but not to the authentication proxy 605.

The method 600 further comprises the following steps: the user entering a blank e-mail address while the confirm status of the e-mail address is not change pending 606; and dealing with blank e-mail input by the authentication proxy 607.

The method 600 further comprises the following steps: the user entering a new e-mail address which is not blank when the confirm status of the e-mail address in the authentication proxy is not NULL 608; and displaying e-mail change message to the user 609.

The method 600 further comprises the following steps: the user entering a new e-mail address which is not blank when the confirm status of the e-mail address in the authentication proxy is NULL 610; and copying the new e-mail address to the authentication proxy and keeping a confirm status of the new e-mail address NULL 611.

Figure 6B:
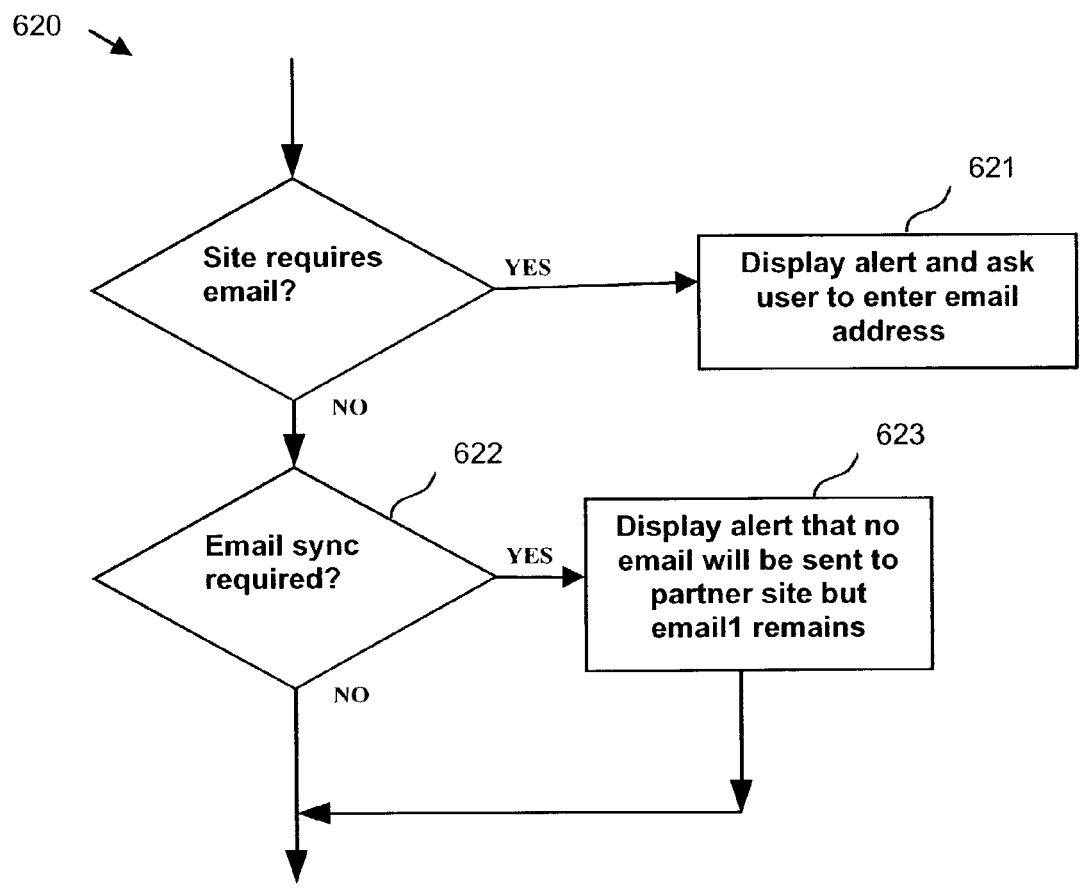
FIG. 6B is a flow diagram illustrating additional processing 620 of step 607 in method 600 in another typical embodiment.

FIG. 6B is a flow diagram illustrating additional processing 620 of step 607 in method 600 in another typical embodiment. The additional processing 620 comprises the following steps: displaying an e-mail address required message to the user and asking the user to reenter if an e-mail address is required by the partner site 621; checking if synchronization of e-mail address is required when e-mail address is not required by partner site 622; and if synchronization is required, displaying a message to the user that no e-mail address is sent to partner site and the e-mail address in the authentication proxy remains 623.

Figure 7:
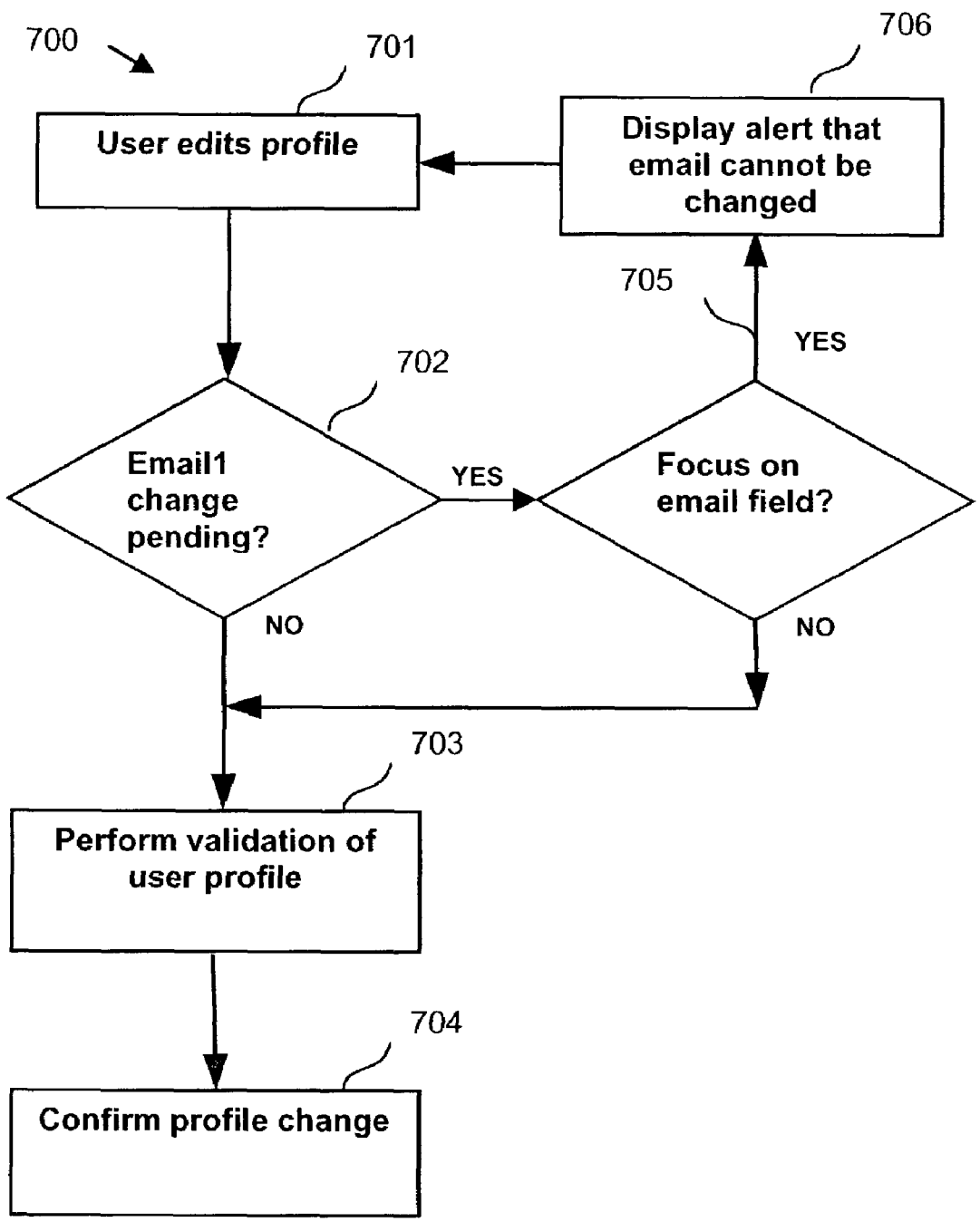
FIG. 7 is a flow diagram illustrating a method 700 for changing profile of a user in an authentication proxy while keeping e-mail address of the user confirmed.

FIG. 7 is a flow diagram illustrating a method 700 for changing profile of a user in an authentication proxy while keeping e-mail address of the user confirmed. The method 700 comprises the following steps: user editing the profile 701; checking whether a confirm status of the e-mail address is change pending 702; validating of new profile data when the user submits the new profile data 703; and confirming profile change after new profile data are submitted 704.

The method 700 further comprises the following steps: the user attempting to change e-mail address when the confirm status of the e-mail address is change pending 705; and displaying a message to the user that the e-mail address cannot be changed 706.

Figure 8A:
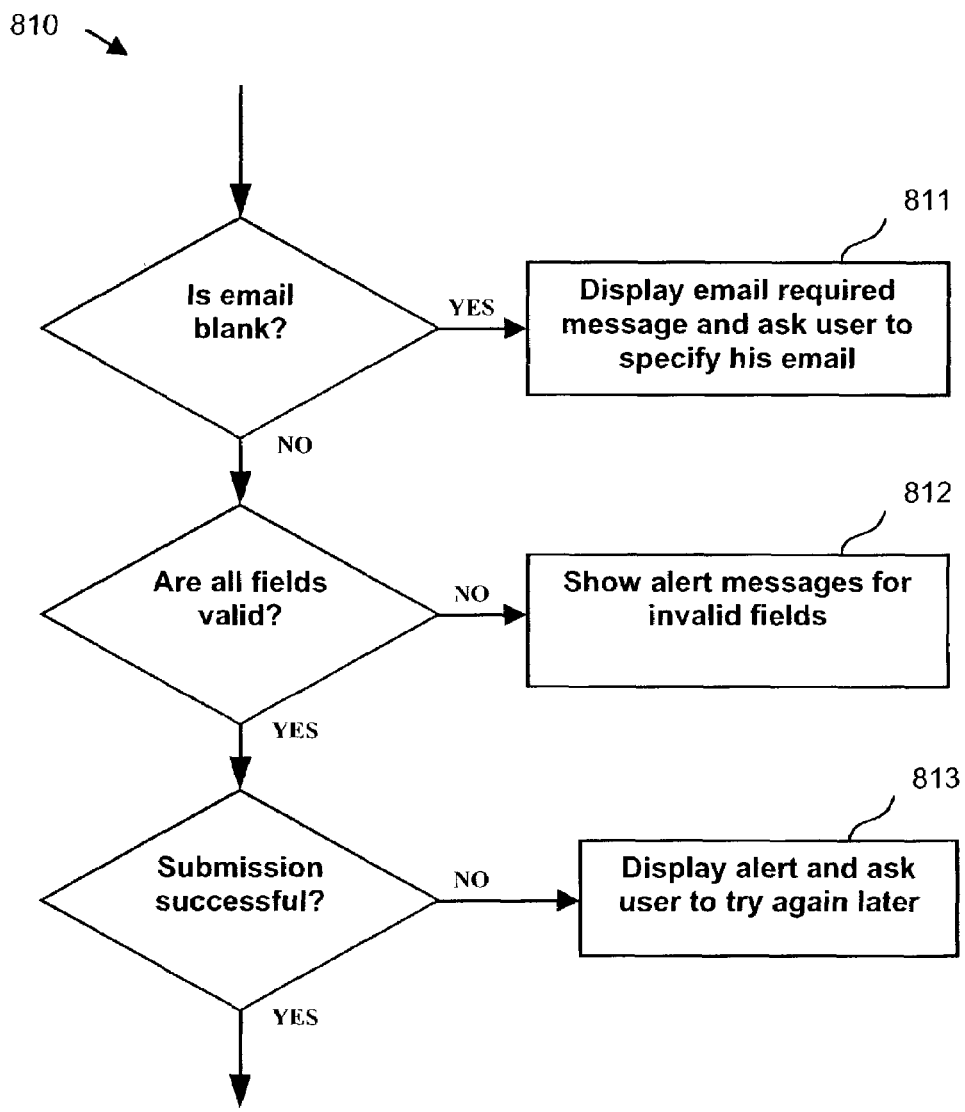
FIG. 8A is a flow diagram illustrating additional processing 810 of step 703 in method 800 in another typical embodiment.

FIG. 8A is a flow diagram illustrating additional processing 810 of step 703 in method 800 in another typical embodiment. The additional processing 810 comprises the following steps: displaying an e-mail address required message to the user and asking the user to reenter if the user enters a blank e-mail address 811.

The additional processing 810 further comprises the following steps: displaying an invalid data message if any information other than e-mail address of the new profile data is invalid 812.

The additional processing 810 further comprises the following steps: displaying a submission error message if submission of the new profile data is not successful 813.

Figure 8B:
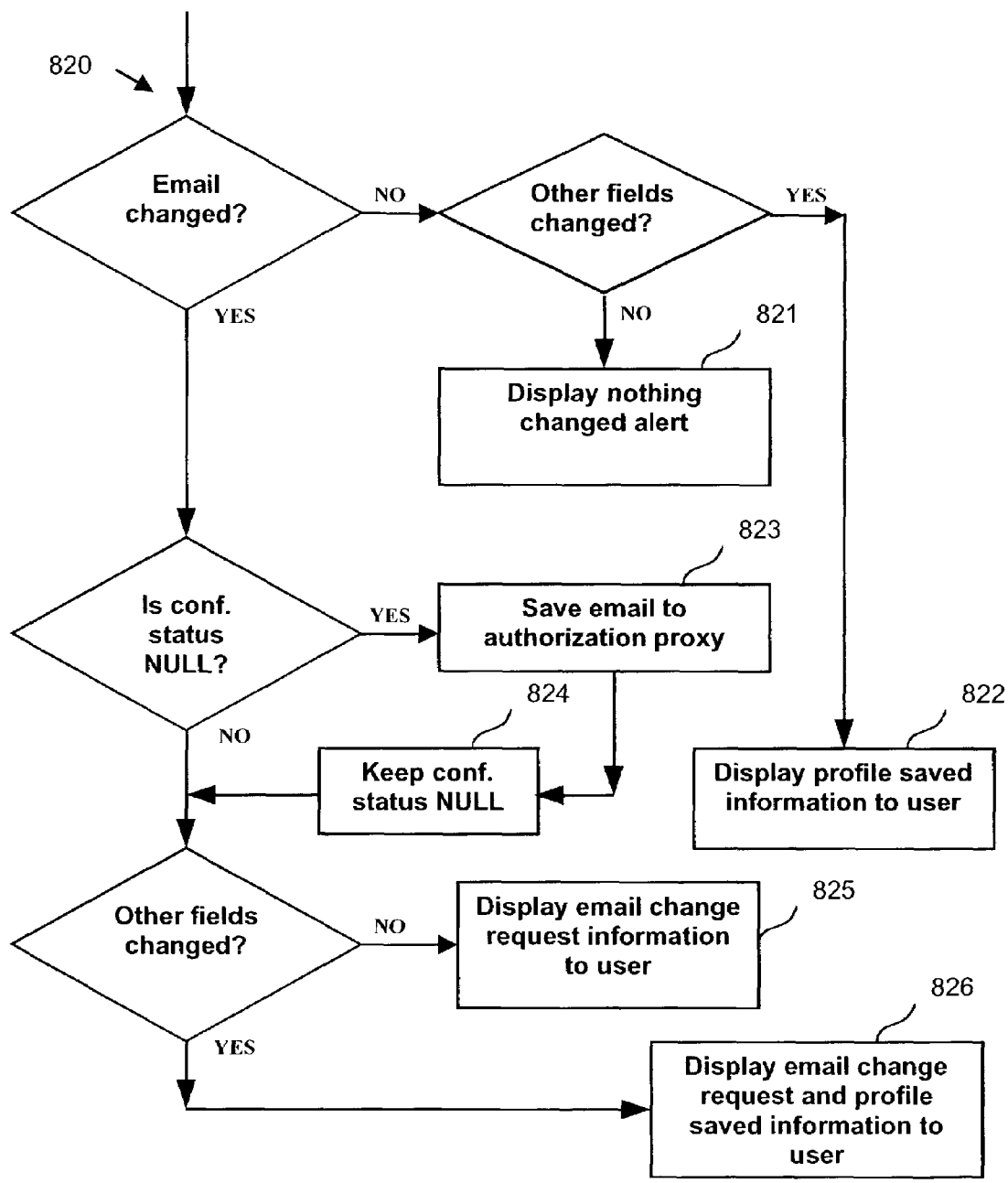
FIG. 8B is a flow diagram illustrating additional processing 820 of step 704 in method 800 in another typical embodiment.

FIG. 8B is a flow diagram illustrating additional processing 820 of step 704 in method 800 in another typical embodiment. The additional processing 820 comprises the following steps: displaying a nothing changed message if no information of the new profile data is changed 821.

The additional processing 820 further comprises the following steps: displaying a profile data saved message if any information other than e-mail address of the new profile data is changed 822.

The additional processing 820 further comprises the following steps: if said confirm status of said e-mail address is NULL and a new e-mail address is entered, saving said new e-mail address to authentication proxy 823; keeping said confirm status NULL 824.

The additional processing 820 further comprises the following steps: displaying an e-mail change message to the user when no other information of the new profile data is changed 825.

The additional processing 820 further comprises the following steps: and displaying an e-mail change and profile saved message to the user when other information of the new profile data is changed 826.

Figure 9A:
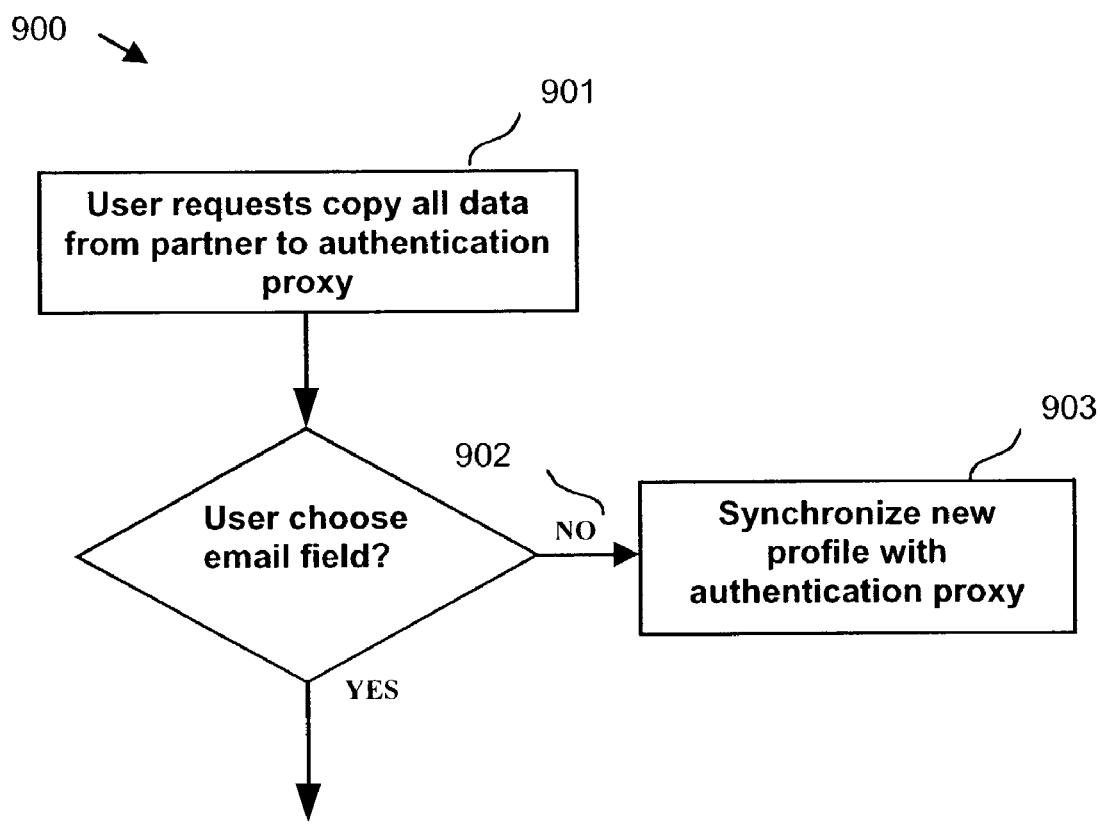
FIG. 9A is a flow diagram illustrating a method 900 for synchronizing all profile data of a user from a partner site of an authentication proxy to the authentication proxy.

FIG. 9A is a flow diagram illustrating a method 900 for synchronizing all profile data of a user from a partner site of an authentication proxy to the authentication proxy. The method 900 comprises the following steps: the user submitting the profile data at the partner site to the authentication proxy 901; the user changing profile fields other than e-mail address 902; and synchronizing the first profile data with the authentication proxy 903.

Figure 9B:
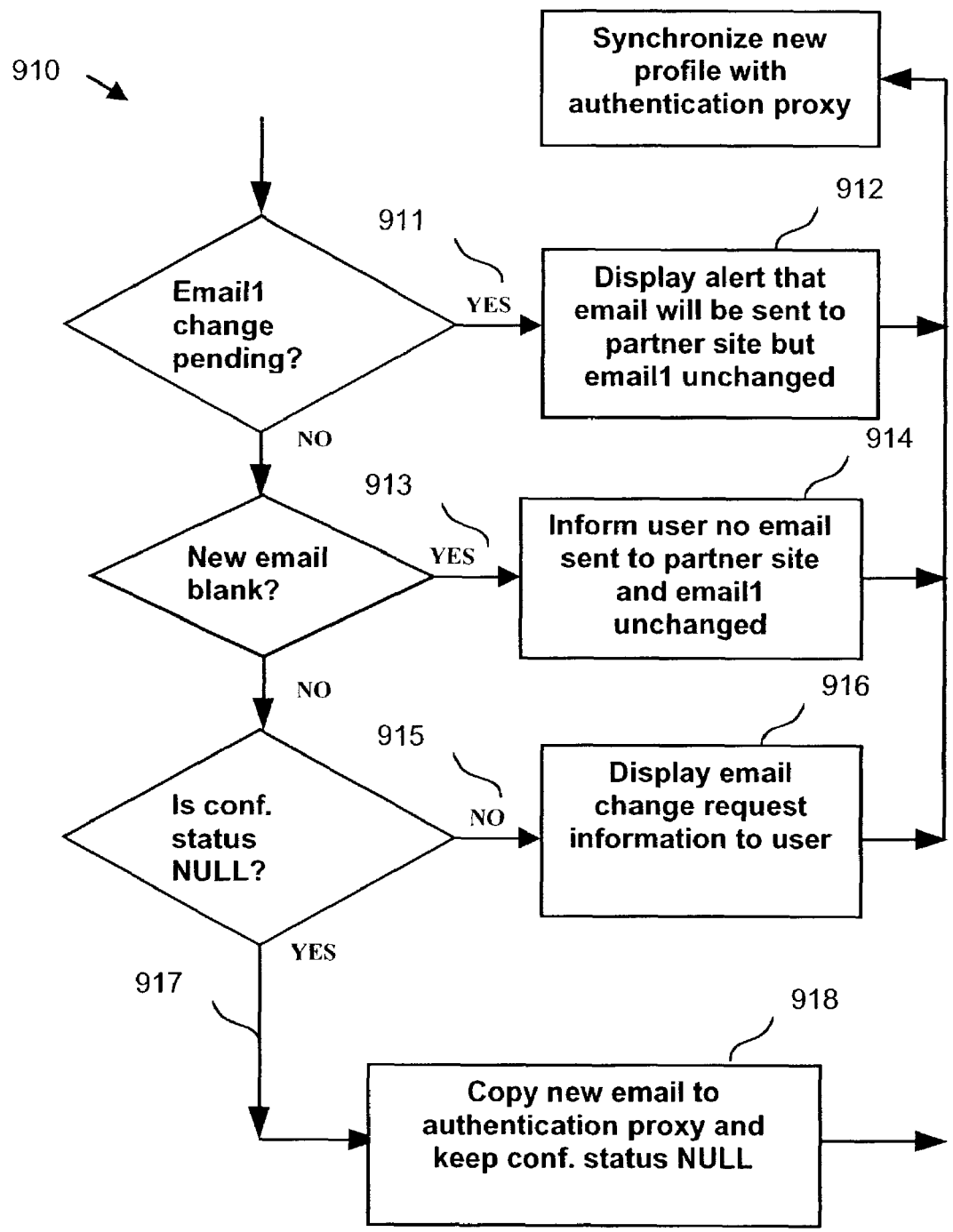
FIG. 9B is a flow diagram illustrating additional processing 910 of method 900 in another typical embodiment.

FIG. 9B is a flow diagram illustrating additional processing 910 of method 900 in another typical embodiment. The additional processing 910 comprises the following steps: the user entering a new e-mail address while the confirm status of the e-mail address is change pending 911; and displaying a message to the user that the new e-mail address will be sent to partner site but not to the authentication proxy 912.

The additional processing 910 further comprises the following steps: the user entering a blank e-mail address while a confirm status of the e-mail address is not change pending 913; and displaying a message to the user that no e-mail address is sent to partner site and the e-mail address in the authentication proxy remains 914.

The additional processing 910 further comprises the following steps: the user entering a new e-mail address which is not blank when the confirm status of the e-mail address in the authentication proxy is not NULL 915; and displaying an e-mail change message to the user 916.

The additional processing 910 further comprises the following steps: the user entering a new e-mail address which is not blank when the confirm status of the e-mail address in the authentication proxy is NULL 917; and copying the new e-mail address to the authentication proxy and keeping a confirm status of said new e-mail address NULL 918.

Figure 10A:
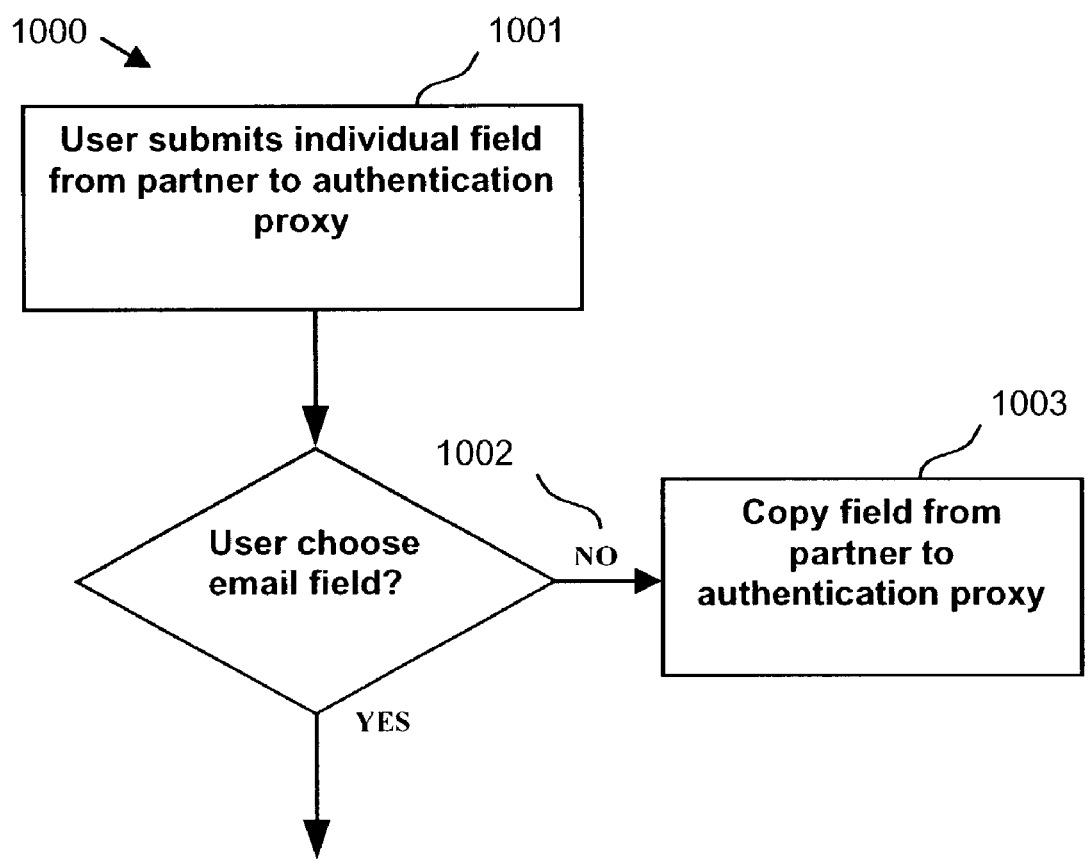
FIG. 10A is a flow diagram illustrating a method 1000 for synchronizing individual field of profile data of a user from a partner site of an authentication proxy to the authentication proxy.

FIG. 10A is a flow diagram illustrating a method 1000 for synchronizing individual field of profile data of a user from a partner site of an authentication proxy to the authentication proxy. The method 1000 comprises the following steps: the user an individual field change of the profile data at the partner site to the authentication proxy 1001; the user changing a field in the first profile data other than e-mail address 1002; and synchronizing the first profile data with the authentication proxy 1003.

Figure 10B:
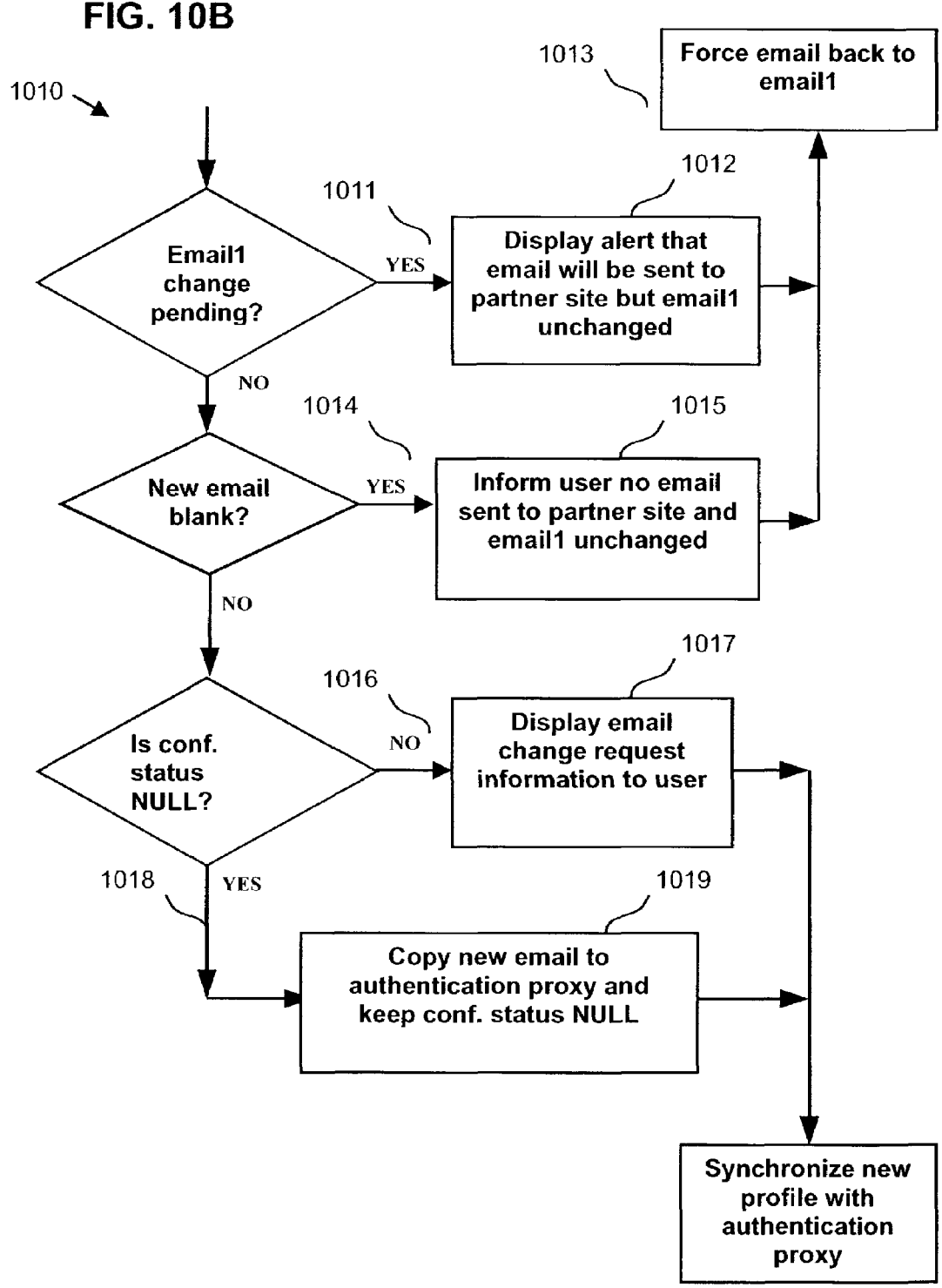
FIG. 10B is a flow diagram illustrating additional processing 1010 of method 1000 in another typical embodiment.

FIG. 10B is a flow diagram illustrating additional processing 1010 of method 1000 in another typical embodiment. The additional processing 1010 comprises the following steps: the user entering a new e-mail address while the confirm status of the e-mail address is change pending 1011; displaying a message to the user that the new e-mail address will be sent to partner site but not to the authentication proxy 1012; and forcing the e-mail address back to the e-mail address in authentication proxy 1013.

The additional processing 1010 further comprises the following steps: the user entering a blank e-mail address while a confirm status of the e-mail address is not change pending 1014; and displaying a message to the user that no e-mail address is sent to partner site and the e-mail address in the authentication proxy remains 1015.

The additional processing 1010 further comprises the following steps: the user entering a new e-mail address which is not blank when the confirm status of the e-mail address in the authentication proxy is not NULL 1016; and displaying an e-mail change message to the user 1017.

The additional processing 1010 further comprises the following steps: the user entering a new e-mail address which is not blank when the confirm status of the e-mail address in the authentication proxy is NULL 1018; and copying the new e-mail address to the authentication proxy and keeping a confirm status of said new e-mail address NULL 1019.

Although the invention is described herein with reference to the preferred embodiment, one skilled in the art will readily appreciate that other applications may be substituted for those set forth herein without departing from the spirit and scope of the present invention.

Accordingly, the invention should only be limited by the claims included below.

The invention claimed is:

1. A method for synchronizing a first e-mail address of a user in a computer-implemented authentication proxy and a second e-mail address of said user in a computer-implemented integrated authorized site of said authentication proxy, said method comprising the computer-implemented steps of:
   (a) checking status of said first e-mail address and said second e-mail address;
   (b) determining if said first e-mail address is blank and said second e-mail address is set, and if so then copying said second e-mail address and a confirm status of said second e-mail address to said authentication proxy site;
   (c) determining if said first e-mail address is set but said second e-mail address is blank, and if so then copying said first e-mail address to said integrated authorized site and confirming e-mail address change to said first e-mail address;
   (d) determining if both said first e-mail address and said second e-mail address are blank, and if so then keeping said first e-mail address blank and a confirm status of said first e-mail address NULL;
   (e) determining if both said first e-mail address and said second e-mail address are set, and if so then checking whether said first e-mail address is the same as said second e-mail address;
   (e1) determining if said first e-mail address is the same as said second e-mail address, and if so then copying said confirm status of said second e-mail address to said authentication proxy; and
   (e2) determining if said first e-mail address is not the same as said second e-mail address, and if so then prompting said user to choose among said first e-mail address and said second e-mail address, or specify a synchronized e-mail address through a graphical interface;
wherein said status of said new e-mail address can be any of: confirm;
unconfirm; and NULL.

2. The method of claim 1, wherein the step(e2) further comprising the sub-steps of:
(e21) determining if said user selects said second e-mail address, and if so then copying said second e-mail address to said authentication proxy;
(e22) determining if said user selects said first e-mail address, and if so then performing operations including:
copying said first e-mail address to said authorized site;
confirming e-mail address change from said second e-mail address to said first e-mail address; and
displaying an e-mail change message to said user; and
(e23) determining if said user specifies a third new e-mail address, and if so then performing operations including:
copying said third new e-mail address to said authorized site;
confirming e-mail address change from said second e-mail address to said third new e-mail address; and
displaying an e-mail change message to said user.

3. A method for registering a user of a computer-implemented authentication proxy to a computer-implemented partner site of said authentication proxy while keeping profile of said user synchronized, comprising the computer-implemented steps of:
said user registering at said partner site;
said user changing profile fields other than e-mail address;
synchronizing said changed profile fields with said authentication proxy;
said user entering a new e-mail address while a confirm status of said e-mail address is change pending; and
transmitting to the user a message stating that said new e-mail address is to be sent to said partner site but not to said authentication proxy.

4. The method of claim 3, further comprising the steps of:
said user entering a blank e-mail address while said confirm status of said e-mail address is not change pending; and
dealing with blank e-mail input by said authentication proxy;
wherein said dealing blank e-mail step further comprising:
displaying an e-mail address required message to said user and asking said user to reenter if an e-mail address is required by said partner site.

5. The method of claim 4, further comprising the steps of:
said user entering a new e-mail address which is not blank when said confirm status of said e-mail address in said authentication proxy is not NULL; and
displaying an e-mail change message to said user.

6. The method of claim 5, further comprising the steps of:
said user entering a new e-mail address which is not blank when said confirm status of said e-mail address in said authentication proxy is NULL; and
copying said new e-mail address to said authentication proxy and keeping a confirm status of said new e-mail address NULL.

7. The method of claim 6, wherein said dealing blank e-mail step further comprises the steps of:
checking if synchronization of e-mail address is required when e-mail address is not required by partner site; and
if synchronization is required, displaying a message to said user that no e-mail address is sent to said partner site and said e-mail address in said authentication proxy remains.

8. A method for changing profile of a user in a computer-implemented authentication proxy white keeping e-mail address of said user confirmed, comprising the computer-implemented steps of:
responsive to said user editing said profile, checking whether a confirm status of said e-mail address is change pending;
validating of new profile data when said user submits said new profile data;
confirming profile change after new profile data are submitted;
responsive to said user attempting to change e-mail address when said confirm status of said e-mail address is change pending:
transmitting to the user a message stating that said e-mail address cannot be changed.

9. The method of claim 8, wherein said validating step further comprises the steps of:
displaying an e-mail address required message to said user and asking said user to reenter if said user enters a blank e-mail address.

10. The method of claim 9, wherein said validating step further comprises the step of:
displaying an invalid data message if any information other than e-mail address of said new profile data is invalid.

11. The method of claim 10, wherein said validating step further comprises the step of:
displaying a submission error message if submission of said new profile data is not successful.

12. The method of claim 11, wherein said confirming step further comprises the step of:
displaying a nothing changed message if no information of said new profile data is changed.

13. The method of claim 12, wherein said confirming step further comprises the step of:
displaying a profile data saved message if any information other than e-mail address of said new profile data is changed.

14. The method of claim 13, wherein said confirming step further comprises the steps of:
if said confirm status of said e-mail address is NULL and a new e-mail address is entered, saving said new e-mail address to authentication proxy; and
keeping said confirm status NULL.

15. The method of claim 14, wherein said confirming step further comprises the step of:
displaying an e-mail change message to said user when no other information of said new profile data is changed.

16. The method of claim 15, wherein said confirming step further comprises the step of:
displaying an e-mail change and profile saved message to said user when other information of said new profile data is changed.

17. A method for synchronizing profile data of a user from a computer-implemented partner site of a computer-implemented authentication proxy to said authentication proxy, comprising the computer-implemented steps of:
said user submitting said profile data at said partner site to said authentication proxy;
said user changing profile fields other than e-mail address;
synchronizing said profile data with said authentication proxy;
said user entering a new e-mail address while the confirm status of said e-mail address is change pending; and
transmitting to the user a message stating that said new e-mail address is to be sent to partner site but not to said authentication proxy.

18. The method of claim 17, further comprising the steps of:

said user entering a blank e-mail address while a confirm status of said e-mail address is not change pending; and displaying a message to said user that no e-mail address is sent to partner site and said e-mail address in said authentication proxy remains.

19. The method of claim 18, further comprising the steps of:

said user entering a new e-mail address which is not blank when said confirm status of said e-mail address in said authentication proxy is not NULL; and displaying an e-mail change message to said user.

20. The method of claim 19, further comprising the steps of:

said user entering a new e-mail address which is not blank when said confirm status of said e-mail address in said authentication proxy is NULL; and copying said new e-mail address to said authentication proxy and keeping a confirm status of said new e-mail address NULL.

21. A method for synchronizing individual field of profile data of a user from a computer-implemented partner site of a computer-implemented authentication proxy to said authentication proxy, comprising the computer-implemented steps of:

said user submitting an individual field change of said profile data at said partner site to said authentication proxy;

said user changing a field in said profile data other than e-mail address;

synchronizing said first profile data with said authentication proxy;

said user entering a new e-mail address while the confirm status of e-mail address for said user at said authentication proxy is change pending;

transmitting to the user a message stating that new e-mail will be sent to partner site but email address at said authentication proxy unchanged; and forcing said e-mail back to said e-mail address in said authentication proxy.

22. The method of claim 21, further comprising the steps of:

said user entering a blank e-mail address while a confirm status of said e-mail address is not change pending;

displaying a message to said user that no e-mail address is sent to partner site and said e-mail address in said authentication proxy remains; and forcing said e-mail address back to said e-mail address in authentication proxy.

23. The method of claim 22, further comprising the steps of:

said user entering a new e-mail address which is not blank when said confirm status of said e-mail address in said authentication proxy is not NULL; and displaying an e-mail change message to said user.

24. The method of claim 23, further comprising the steps of:

said user entering a new e-mail address which is not blank when said confirm status of said e-mail address in said authentication proxy is NULL; and copying said new e-mail address to said authentication proxy and keeping a confirm status of said new e-mail address NULL.

25. A digital data processing machine programmed to perform operations for synchronizing and validating user contact information stored in two locations, the operations comprising:

authenticating a user when said user signs in to an authentication proxy;

synchronizing a first contact information of said user in a first location and a second contact information of said user in a second location;

validating a synchronized contact information of said user;

confirming contact information change of said user from an old contact information to a new contact information;

synchronizing a profile of said user to a partner site when said user registers to said partner site;

synchronizing said contact information of said user between said first location and said second location when said user changes his profile data;

synchronizing all profile data of said user to a partner site while keeping said contact information synchronized and validated;

synchronizing individual field of profile data of said user to a partner site while keeping said contact information synchronized and validated; and confirming e-mail address change of said user.

26. The machine of claim 25, where the machine is further programmed to perform the operations comprising:

providing a graphical interface for said user to choose among said first contact information and said second contact information, or specify said synchronized contact information.

27. The machine of claim 25, where the machine is further programmed such that the validating operation further comprises operations of providing:

a contact information not confirmed message; and a list of options comprising any of a confirm later option, a requesting new confirm message option, and a specifying new contact information option.

* * * * *